United States Patent Office 3,669,626
Patented June 13, 1972

3,669,626
INTERACTION CORRECTION IN CONTINUOUS FLOW ANALYSIS
Ralph E. Thiers, Woodland Hills, and Julius Meyn, Jr., Santa Monica, Calif., assignors to Bio-Science Laboratories, Van Nuys, Calif.
No Drawing. Filed Nov. 4, 1970, Ser. No. 86,971
Int. Cl. G01n 1/18, 13/00
U.S. Cl. 23—230 A    8 Claims

ABSTRACT OF THE DISCLOSURE

A method for correcting for interaction between successive fluid samples in continuous flow analysis comprises analyzing a series of fluid standards, two of which are identical. The standards are analyzed in any order in which one of the identical standards is preceded by a standard of higher concentrational value and the other is preceded by a standard of lower concentrational value. Analysis of the analytical results by a reiterative estimation procedure provides an accurate estimate of interaction and a calibration curve corrected for interaction. These can be used to provide analytical sample data corrected for interaction.

DESCRIPTION OF THE PRIOR ART

The method of the invention is useful in the operation of continuous flow analyzers, such as those sold by the Technicon Instrument Corporation under the name Auto Analyzer. In general, such continuous flow analyzers operate to transmit a plurality of fluid samples (each containing a substance to be analyzed) to form a sample fluid stream, typically along a hollow tube. The samples are continuously transmitted in sequence, and mixing of separate samples along the tube is decreased by the introduction of gas bubbles. The samples are treated in various known ways for analysis of the substance contained therein. For example, the samples in the sample stream may be dialyzed, heated, cooled, added to analytical reagents and mixed therewith according to known techniques using conventional equipment. The treated sample stream is then analyzed, typically with an electrical sensor such as pH electrodes or a photoelectric sensor such as a colorimeter and flow cell to provide an electrical signal corresponding to the results of the analysis. The signals obtained are stored and/or recorded by means such as, for example, strip chart recorders, or analog to digital converters with appropriate digital recording equipment. The signals can be provided in the form of digital bits and operated upon using conventional digital computers for such operations as calculating the concentration levels of the substance in each sample from the signal obtained and a calibration curve obtained using samples of known concentration levels. Such procedures are described, for example, by Hicks et al. in "On-Line Data Acquisition in the Clinical Laboratory" in Computers in Biomedical Research, edited by R. W. Stacy and B. D. Waxman, 3, 16, Academic Press, New York (1969).

In continuous flow analysis, it has long been known that interaction takes place between samples in the sample stream so that the signal corresponding in time sequence to each sample corresponds to the concentration of the substance in the sample as influenced by interaction with the preceding sample.

It has been known for some time that a mathematical correction for interaction can be applied in routine continuous flow analysis, and that accuracy is thereby improved. However, a complete and rigorous correction is so time consuming as to be impractical, and the only effective use of the technique has been in removing the error from those samples which happen to follow other samples of very high or low concentration. The general practice has, therefore, been to run continuous flow analyzers at rates (samples per hour) which keep interaction to an acceptable value. In routine work such a value tends to be one at which the work of repeating a small number of samples which follow very high or low results is more than offset by the increase in rates which makes this repetition necessary. In general, at rates greater than about 60 samples per hour interaction becomes so great as to make the results unusable.

In conventional use of continuous flow analysis, a series of fluid standards containing known concentrations of the substance to be analyzed are typically transmitted through the sample stream to provide a calibration curve indicating the relationship between the concentration of the substance in the fluid standards and the signals corresponding to the results of the analysis. However, the calibration curve itself suffers from interaction and gives erroneous estimates of concentration. This is often observable in continuous flow analysis as a dependence of the results upon the order in which standards are run.

It is also known to measure interaction by means of an "Interaction Test Pattern" obtained from a series of standards which permit calculation of degree of interaction. In general the concentration-sequence "zero, low, high, repeat of low" is used. The interaction, in concentration units, is given by the difference between the apparent concentration of second low standard and the first. This value ($\times 100$) divided by that of the high standard gives the percent interaction, percent I. While such a check is easy, it requires that four special samples be run as an "Interaction Test Pattern." The extra room, time, and training required has seemed too expensive to most laboratories.

A computer can, of course, make all of the calculations necessary to measure and correct for interaction. The frequency with which the measurement can and should be made depends upon its expense and upon how quickly interaction changes. If one were to measure interaction as often as standards are run, such measurement would provide a useful additional quality control parameter for continuous flow analysis, as well as permitting accurate results from conventional continuous flow analyzers at accelerated rates such as from about 90 to about 240 samples per hour.

BRIEF SUMMARY OF THE INVENTION

It has now been found that the interaction errors introduced into continuous flow analysis can be corrected by the use of a particular series of fluid standards which can also be employed in preparing a calibration curve. The correction is complete, applying first to the standards of the calibration curve and then to the unknown samples. The correction accurately measures the interaction from the standards of the calibration curve, even though they are themselves rendered inaccurate by interaction. The method requires the addition of only one extra standard to a conventional calibration curve. After correction, the calibration curve is independent of the order in which the standards were run. Because interaction is one of the main factors which limit the speed of continuous flow analysis, the method can be employed to increase the rate of routine analysis.

In the method of the invention a plurality of $n$ fluid standards A, B. C . . . $n$ are prepared each containing a known concentration of the substance to be analyzed. An additional standard, herein designated "(SIN)" as an acronym for "Standard for INteraction," is also prepared, the (SIN) standard being a duplicate of one of the $n$ fluid standards, herein designated as standard A for ease of reference. The concentrations of the substance in each standard are herein designated "C" with an appropriate subscript identifying an individual standard.

The concentrations of the substance employed in the $n+1$ standards are selected to provide representative concentrations and signals across the range of concentrations expected with the type of fluid samples analyzed and the range at which the desired levels of accuracy and precision are obtained with the method of analysis, detector and signal recording means. In general, the concentrations employed should include a minimum concentration (preferably a blank) a maximum expected concentration, a first intermediate concentration and two additional concentration levels intermediate the first intermediate and the maximum and minimum concentrations. A series of seven standards, comprising a blank (with zero concentration) a high standard containing a preselected maximum concentration, and four intermediate concentrations in increasing approximately equal increments from the blank to the maximum, in addition to the (SIN) standard are sufficient to most cases. The (SIN) standard and its duplicate, A, have a concentration level intermediate that of the minimum and maximum standards and preferably have a concentration from about 25 to about 75 percent of the maximum, falling within the central half of the concentration range involved.

The $n+1$ standards are sequentially and consecutively transmitted, separated, treated and analyzed by conventional continuous flow analysis under the identical conditions to be used in analysis of the samples, and at an accelerated sampling rate sufficient to provide appreciable interaction, such as from about 4 to about 10 percent. The order in which the standards are transmitted is not critical, provided they are transmitted consecutively. However, the calculations necessary to determine the amount of interaction are simplified and accuracy is improved by transmitting the duplicate standards A and (SIN) in a non-consecutive fashion, that is, with at least one of the standards B, C, D . . . $n$ sequentially intermediate the A and (SIN) standards. Such practice ensures that differences between the signals $S_A$ and $S_{SIN}$ sequentially corresponding to the A and (SIN) standards will be due to interaction with one or more other standards and not with the duplicate standard. Additionally, the precision of the method is greatly increased when the (SIN) standard is immediately sequentially preceded by a standard having a concentration C of the substance greater than the concentration $C_{SIN}$ of the substance in the (SIN) standard; and when the A standard is preceded by a standard having a concentration lower than the concentration $C_A$ of the duplicate A standard. Preferably the duplicate A standard is immediately preceded by a blank standard containing zero concentration. Additional variations can be made in the time order of the standards without significantly affecting accuracy or precision. Thus the standards B, C, D . . . $n$ can be run in either ascending or descending concentration sequences, provided that A follows a lower concentration standard and (SIN) follows a higher concentration standard.

In use, the selected sequence of standards A, B, C . . . $n$, and (SIN) is analyzed, producing a series of signals $S_A$, $S_B$, $S_C$ . . . $S_n$ and $S_{SIN}$ sequentially corresponding to the samples. The initial concentrations $C_A$, $C_B$, $C_C$ . . . $C_n$ are employed as a first estimate of the concentrations of the substance actually associated with the corresponding signals, although due to interaction the initial concentrations are expected to provide inaccurate estimates.

The signals $S_A$, $S_B$, $S_C$ . . . $S_n$ are ordered by magnitude and by the concentrations $C_A$, $C_B$, $C_C$ . . . $C_n$ of the corresponding samples, conveniently by preparing a calibration curve plot of Signal versus Concentration. A first estimated concentration $C^1_{SIN}$ is then interpolated for the SIN standard from the signals next higher and next lower to $S_{SIN}$ and the concentration values corresponding thereto. Depending upon the sequential order in which the samples are run, these next higher and next lower values may correspond to any two of the standards A, B, C . . . $n$, or to one of the standards in the event a duplicate signal is obtained.

The difference between the estimated concentration $C_A$ corresponding to the A standard and the first estimated concentration $C^1_{SIN}$ is calculated and divided by the concentration of the standard which immediately preceded (SIN) in sequence to obtain a first estimated interaction value $I_1$.

The first estimated interaction value is then employed to produce a sequence of second estimated concentration values $C^2_A$, $C^2_B$, $C^2_C$ . . . $C^2_n$ corresponding to the standards A, B, C . . . $n$, by adding to each concentrational value $C_A$, $C_B$, $C_C$ . . . $C_n$, the product of $I_1$ and the concentrational value corresponding to the sequentially preceding standard.

A second estimated concentration $C^2_{SIN}$ of the (SIN) standard is then calculated as described above by interpolation from the next higher and lower signals to $S_{SIN}$ and the second estimated concentrations $C^2$ associated therewith in sequence. The difference between the second estimated concentration $C^2_{SIN}$ and the second estimated concentration $C^2_A$ is determined. This difference, divided by the second estimated concentration for the standard sequentially next preceding the SIN standard, provides a second estimated interaction value $I_2$.

The first and second estimated interaction values $I_1$ and $I_2$ are compared. If the two values $I_1$ and $I_2$ are the same, the set of second estimated concentration values can then be employed as a conventional calibration curve to determine the concentrations of the substance in each sample analyzed on the continuous flow analyzer, and the stable value of I thus obtained can be used to correct the concentrational values obtained with the samples for interaction between samples. If the values of $I_1$ and $I_2$ are different, then the interaction value $I_2$ is again employed to obtain a set of third estimated concentrations $C^3_A$, $C^3_B$, $C^3_C$ . . . $C^3_n$, which are, in turn, used to obtain a third estimated concentration value $C^3_{SIN}$, and a third estimated interaction value $I_3$ is computed for comparison with $I_2$. The successive estimation of concentrations, calculations of I and comparison are reiterated until a stable value of I is reached, that is, until the reiterative estimations produce two identical successive values of I.

The calculations necessary for generating a standard curve corrected for interaction can be carried out with the aid of a digital computer using a program and equipment described by Thiers et al. in Clinical Chemistry, Volume 16, No. 10, pp. 832–839 (1970). The calculations may also be carried out "manually" in situations in which a continuous flow analyzer is employed without a computer or without digital read-out or recording equipment, for example. When the signal is provided in digital form, either using a digital computer or an analog to digital converter for converting signals initially provided by a sensor such as a colorimeter, the resolution of the determination of interaction, and the number of reiterative computations required are limited by the number of digital bits into which the signal range of the standards is divided. When the signals are provided in continuous form, for example, as peaks in a strip chart record, resolution and the number of reiterations depend in part on the scale resolution of the strip chart. Since the measurement of interaction value or percent interaction depends on the difference between the signals corresponding to the duplicate SIN and A standards, and this difference is less the total signal scale, the number of reiterative calculations required to reach a stable value of I is limited.

In a representative operation, continuous flow analysis of glucose is carried out on an Auto Analyzer (Technicon Instrument Corp., Tarrytown, N.Y.) using conventional methods, except that the analyses are carried out under conditions providing greater than 4 percent interaction. A LINC-8 digital computer (Digital Equipment Corp., Maynard, Mass.) is employed to carry out the computations. A series of seven standards A–F and (SIN) are prepared containing 150, 0, 50, 100, 200, 250 and 150 milligrams of glucose, respectively, per 100 milliliters. The standards A–F and (SIN) are analyzed in the following consecutive sequence F, E, (SIN), D, C, B, A so that (SIN) ($C_{SIN}=150$) follows $E(C_E=200)$ and $A(C_A=150)$ is preceded by the blank, B. Using the above concentrations as first estimated concentrations the first estimated concentration for (SIN) is interpolated from the next higher and next lower signals which correspond to A and E, respectively, to be 163. The difference between $C^1_{SIN}$ and $C^1_A$ of 13, is divided by $C^1_E$ of 200 to provide a first estimate of interaction of $I_1=0.065$ (percent $I=6.5$). The second estimated concentrations are calculated by adding the product of $I_1$ and $C^1_F$ to $C_E$, and so on, to obtain a series of second estimated concentration values $C^2_A-F$ of 150, 3, 56, 111, 216, and 250. $C^2_{SIN}$ is found by interpolation to be 167, and $I_2$ is found to be $(167-50)/216$ or 0.079. A third series of estimated concentrations are obtained with values $C^3_{A-F}$ of 150, 5, 59, 113, 220 and 250, and a $C^3_{SIN}$ of 168 is interpolated, providing $I_3$ of 8.2. Reiteration using $I_3$ produces a fourth series of estimated concentrations in which $C^4_{A-F}$ are 150, 5, 59, 114, 220 and 250. $C^4_{SIN}$ and $I_4$ are identical to $C^3_{SIN}$ and $I_3$.

In a similar operation total protein is determined by continuous flow analysis using conventional procedures (Auto-Analyzer Technical Method File, Total Protein N–146, Technicon Instrument Corp., Tarrytown, N.Y.). The $n$ standards employed have protein concentrations of 0, 2, 4, 6, 8, and 10 grams per 100 milliliters, $C_{SIN}$ being 4 grams per milliliter. Following the standards a series of randomly selected samples are run alternating with a standard containing 4 grams total protein per 100 milliliters. The analysis is repeated at various sampling rates from 60 per hour (no interaction) to 240 samples per hour (15 percent interaction, $I=0.15$). The results obtained for the 4 grams per 100 milliliter repeated standards indicate that the uncorrected results obtained depart from the known concentration at sampling rates above 90 per hour, substantial departures being evident at rates from 120 to 240 samples per hour. The results corrected by a corrected calibration curve and interaction estimate obtained by the method of the invention show good agreement with the concentration value of 4 grams per 100 milliliters, at rates from 90 to 240 samples per hour and excellent correlation is obtained with rates of 120 to 180 samples per hour.

What is claimed is:

1. In a method for continuous flow analysis of a plurality of fluid samples successively transmitted along a sample fluid stream, comprising analyzing the samples in the stream for the concentration of a substance, providing a signal corresponding to the results of such analysis and recording the signals, the improvement which comprises:

(a) continuously transmitting and analyzing the samples and providing the signals under conditions adapted to provide significant interaction between successive samples;

(b) providing a series of $n$ fluid standards, A, B, C . . . $n$, each containing a different known concentration level of the substance to be analyzed, said concentration levels being selected to provide a series of different concentration levels representative of a preselected concentration range expected to be present in the plurality of fluid samples to be analyzed, and an additional fluid standard (SIN) containing the identical concentration as one of the $n$ fluid standards;

(c) transmitting, analyzing, and providing a signal with the fluid standards A, B, C . . . $n$, and (SIN) under conditions identical to those employed for the fluid samples, the standards being transmitted and analyzed consecutively in a sequence in which one of the standards, A, containing identical concentrations of the substance is immediately preceded by a standard containing a lower concentration thereof and one of the standards (SIN) containing identical concentrations of the substance is immediately preceded by a standard having a higher concentration thereof;

(d) determining an estimated concentrational value for the standard (SIN) by interpolation from the magnitude of the concentrations of the $n$ standards and the magnitude of the signals corresponding to the $n$ standards and the SIN standard; and (e) determining an estimate of interaction, $I_1$, from the quotient of the difference between the concentrational value of the A standard and the estimated concentrational value for the (SIN) standard divided by the concentrational value of the standard immediately sequentially preceding the (SIN) standard.

2. The method of claim 1, further comprising the steps of determining a series of second estimated concentrational values $C^2_A$, $C^2_B$, $C^2_C$ . . . $C^2_n$ from the estimate of interaction $I_1$ and the sequential order of the standards; determining a second estimated concentrational value $C^2_{SIN}$ for the (SIN) standard by interpolation from the magnitude of the signals and the second estimated concentrational values; determining a second estimate of interaction $I_2$ from the difference between the second estimated concentrational values $C^2_A$ and $C^2_{SIN}$ for the identical standards and the second estimated concentrational value for the standard sequentially preceding the (SIN) standard; and comparing the estimates of interaction.

3. The method of claim 2 further comprising reiterating the steps of determining a series of estimated concentrational values for the standards A, B, C . . . $n$; determining an estimated concentrational value for the (SIN) standard, determining an estimate of interaction and comparing the estimates of interaction until a stable value for the estimate of interaction is obtained.

4. The method of claim 1 wherein the number of the $n$ standards is at least five.

5. The method of claim 1 wherein the continuous flow analysis is carried out at a rate of from 90 to 240 fluid samples per hour.

6. The method of claim 5 wherein the continuous flow analysis is carried out at a rate of from about 120 to about 180 fluid samples per hour.

7. The method of claim 1 wherein the standard which precedes the duplicate standard A is a blank standard having zero concentration of the substance.

8. The method of claim 1 wherein the $n$ standards comprise a set of calibration curve standards including a blank standard, a maximum concentration standard and a plurality of standards having different concentrations of the substance intermediate the concentrations thereof in the blank and maximum concentration standards.

References Cited

UNITED STATES PATENTS

| | | | |
|---|---|---|---|
| 3,241,432 | 3/1966 | Skeggs et al. | 23—230 R |
| 3,339,063 | 8/1967 | Norsworthy | 235—151.13 |
| 3,535,084 | 10/1970 | Izawa et al. | 23—230 A |

JOSEPH SCOVRONEK, Primary Examiner

R. E. SERWIN, Assistant Examiner

U.S. Cl. X.R.

23—230 R; 235—151.12, 151.13, 151.35

PO-1050
(5/69)

UNITED STATES PATENT OFFICE
CERTIFICATE OF CORRECTION

Patent No. 3,669,626      Dated  13 June 1972

Inventor(s)  Ralph E. Thiers and Julius Meyn, Jr.

It is certified that error appears in the above-identified patent and that said Letters Patent are hereby corrected as shown below:

Column 5, line 24, change "(167-50)" to --(167-150)--.

Signed and sealed this 17th day of October 1972.

(SEAL)
Attest:

EDWARD M. FLETCHER, JR.
Attesting Officer

ROBERT GOTTSCHALK
Commissioner of Patents